(12) United States Patent
Robert et al.

(10) Patent No.: US 12,465,926 B2
(45) Date of Patent: Nov. 11, 2025

(54) CABIN AIR FILTER WITH POLARISATION

(71) Applicant: HENGST SE, Münster (DE)

(72) Inventors: Stefan Robert, Nordwalde (DE);
Andreas Borchard, Coesfeld (DE);
Martin Rölver, Havixbeck (DE); Tom Klaver, Cologne (DE)

(73) Assignee: HENGST SE, Münster (DE)

( * ) Notice: Subject to any disclaimer, the term of this patent is extended or adjusted under 35 U.S.C. 154(b) by 0 days.

(21) Appl. No.: 18/807,534

(22) Filed: Aug. 16, 2024

(65) Prior Publication Data
US 2025/0083155 A1    Mar. 13, 2025

Related U.S. Application Data (63) Continuation of application No. PCT/EP2023/053663, filed on Feb. 14, 2023.

(30) Foreign Application Priority Data

Feb. 18, 2022 (EP) .................................. 22157505
Jun. 29, 2022 (EP) .................................. 22182008

(51) Int. Cl.
*B03C 3/68* (2006.01)
*B03C 3/38* (2006.01)
(Continued)

(52) U.S. Cl.
CPC ................ *B03C 3/68* (2013.01); *B03C 3/38* (2013.01); *B03C 3/62* (2013.01); *B03C 3/64* (2013.01);
(Continued)

(58) Field of Classification Search
CPC ...... B01D 46/32; B01D 46/50; B01D 46/526; B01D 46/785; B01D 53/323;
(Continued)

(56) References Cited

U.S. PATENT DOCUMENTS

| | | |
|---|---|---|
| 3,438,180 A | 4/1969 | Klouda |
| 3,735,560 A | 5/1973 | Wellman |
| (Continued) | | |

FOREIGN PATENT DOCUMENTS

| | | |
|---|---|---|
| CN | 101010142 A | 8/2007 |
| CN | 102000468 A | 4/2011 |
| (Continued) | | |

OTHER PUBLICATIONS

European Patent Office, Extended Search Report, Application No. 22157505.3, Aug. 22, 2022, 10 pages.
(Continued)

*Primary Examiner* — Jennifer Dieterle
*Assistant Examiner* — Sonji Turner
(74) *Attorney, Agent, or Firm* — Quarles & Brady LLP; Yakov Sidorin (57) ABSTRACT

A gas filter that includes a filter medium configured to filter a gas flow propagating from an upstream facing side through the filter medium to a downstream facing side. The filter medium includes a capacitor with a first electrode, a second electrode , and a dielectric medium. The gas filter also includes a first electrical contact and a second electrical contact such that if the first electrical contact is electrically connected via a first resistor to a branching point and the second electrical contact is electrically connected via a second resistor the same branching point. Further, the first electrode is preferably electrically connected to such branching point and the second electrode is preferably electrically connected to the second electrical contact.

19 Claims, 4 Drawing Sheets

(51) Int. Cl.
  *B03C 3/62* (2006.01)
  *B03C 3/64* (2006.01)
  *B03C 3/66* (2006.01)
  *B03C 3/82* (2006.01)
  *B60H 3/00* (2006.01)

(52) U.S. Cl.
  CPC .................. *B03C 3/66* (2013.01); *B03C 3/82* (2013.01); *B60H 3/0071* (2013.01); *B03C 2201/30* (2013.01)

(58) Field of Classification Search
  CPC ...... B01D 2239/0435; B01D 2239/654; B01D 2239/65; B03C 3/09; B03C 3/12; B03C 3/38; B03C 3/41; B03C 3/47; B03C 3/62; B03C 3/64; B03C 3/34; B03C 3/66; B03C 3/82; B03C 3/86; B03C 3/155; B03C 3/68; B03C 2201/30; H05H 1/2406; H05H 1/2425; H05H 1/2431; H05H 1/2473; F24F 8/194; F24F 8/192; B60H 3/71
  See application file for complete search history.

(56) References Cited

U.S. PATENT DOCUMENTS

| | | | | |
|---|---|---|---|---|
| 3,999,964 | A * | 12/1976 | Carr | B03C 3/12 55/499 |
| 4,509,958 | A | 4/1985 | Masuda et al. | |
| 4,978,372 | A * | 12/1990 | Pick | B03C 3/155 96/99 |
| 5,364,458 | A * | 11/1994 | Burnett | B03C 3/155 96/68 |
| 6,497,754 | B2 * | 12/2002 | Joannou | B03C 3/155 264/129 |
| 7,112,238 | B2 | 9/2006 | Joannou | |
| 7,258,729 | B1 * | 8/2007 | Barsimanto | B03C 3/60 96/97 |
| 9,579,663 | B2 * | 2/2017 | McKinney | B03C 3/82 |
| 2005/0109204 | A1 | 5/2005 | Coppom et al. | |
| 2006/0137527 | A1 * | 6/2006 | Joannou | B03C 3/155 96/66 |
| 2006/0272504 | A1 * | 12/2006 | Nutsos | B03C 3/155 96/88 |
| 2007/0199450 | A1 | 8/2007 | Wiser et al. | |
| 2008/0190772 | A1 | 8/2008 | Greist et al. | |
| 2011/0002814 | A1 | 1/2011 | Wiser et al. | |
| 2014/0069274 | A1 | 3/2014 | McKinney | |
| 2017/0341087 | A1 | 11/2017 | Yuge et al. | |
| 2019/0160475 | A1 | 5/2019 | Cwik | |

FOREIGN PATENT DOCUMENTS

| | | |
|---|---|---|
| CN | 102853489 A | 1/2013 |
| CN | 107413132 A | 12/2017 |
| DE | 102021120127 A1 | 2/2023 |
| JP | 3262551 A | 11/1991 |
| JP | 3270744 A | 12/1991 |
| JP | H0691199 A * | 4/1994 |
| JP | 2006234246 A | 9/2006 |
| KR | 20190098616 A | 8/2019 |
| KR | 20200057523 A | 5/2020 |
| WO | 2012161995 A1 | 11/2012 |
| WO | 2020263171 A1 | 12/2020 |

OTHER PUBLICATIONS

European Patent Office, Extended Search Report, Application No. 22182008.7, Dec. 23, 2022, 13 pages.
PCT International Search Report and Written Opinion, PCT/EP2023/053664, Apr. 28, 2023, 11 pages.
PCT International Search Report and Written Opinion, PCT/EP2023/053663, May 9, 2023, 12 pages.
Hansel, et al., Transport involving conducting fibers in a non-conducting matrix, International Journal of Thermal Services, Sep. 2010, 1561-1566, vol. 49, Issue 9.
Notice of Opposition against EP 4 230 299, Sep. 11, 2025, 56 pages.

* cited by examiner

FIG. 8

CABIN AIR FILTER WITH POLARISATION

CROSS-REFERENCE TO RELATED APPLICATIONS

This application is a continuation of pending International Application No. PCT/EP2023/053663 filed on Feb. 14, 2023, and now published as WO 2023/156403, which designates the United States and claims priority from the European Patent Applications No. 22157505.3 filed on Feb. 18, 2022 and No. 22182008.7 filed on Jun. 29, 2022. The disclosure of each of these patent documents is incorporated herein by reference.

BACKGROUND

1. Field of the Invention

The invention relates to a passenger cabin air filter, or more generally to a gas filter and to a housing for the gas filter and to a gas filter system including at least the gas filter.

2. Description of Related Art

Passenger cabin air filters systems, remove pollutants from the ambient air and provide the cleaned air to the interior of a passenger cabin of a vehicle. Essentially the same technology may be used in other fields, e.g., for building ventilation.

Usually "filtration" references to removal of particulate matter from a gas stream by a sieving the gas stream using fibrous filter—the sieve. Cleaning the air based on sieving alone requires balancing between the size of the smallest particles to be held back in the sieve and the pressure drop of the sieving element—the fibrous filter medium. Removing particulate matter from a gas stream by filtration appears to be a result of a number of effects including interception, diffusion, inertial impaction. It has been suggested to improve particle removal from a gas stream using electrostatic forces by means of electret filters. The particle removal of these electret filters, however, appears to fade with increasing deposition of the fibers with particles. To address this drawback, it has been suggested to apply an external electrical field across the filter medium by locating the filter medium as a dielectric medium between two air permeable electrodes. Even non-charged submicron sized particles can be effectively removed from the gas stream using this technique and it is referred to as active field polarized media air cleaning, which are to be distinguished from electrostatic precipitation and passive electrostatic filters (electret filters). Herein we focus on active field polarized media air cleaners and the optional but preferred combination active field polarized media air cleaning with gas cleaning based on gas ionization.

These active field polarized media gas cleaners usually have a gas filter housing with a receptacle for a gas filter and a high-voltage (HV) source being connected to the electrodes of the gas filter. Once the service life of the gas filter is reached it is removed from the housing and replaced by another one. The housing hence has at least two electrical contacts for removably contacting corresponding electrical contacts of the gas filter, thereby enabling to provide an electrical connection of the gas filter with the HV-source.

US 2007/0199450 A1 suggest an air filter having two air permeable ground electrodes and an air permeable HV electrode in between of these. Between each ground electrode and the HV electrode is a dielectric filter medium. The HV-field between the electrodes polarizes both, the particles as well as the fibers of the dielectric.

US 2006/0137527 A1 discloses a polarized media air filter. The filter medium is located between a first and a second electrode. The first electrode is connected via a resistor to a high voltage source. The second electrode is connected to the other port of the high voltage source. In the figures, a resistor is located in a gap between the two electrodes, but not connected to both of them. This resistor symbolizes the electrical leakage resistance in case of sparking. The resistivity of the electrodes is chosen to be high to thereby cause a voltage drop over the electrodes in case of any leak current to thereby extinct sparking.

US 2008/0190772 A1 discloses in another polarized media air filter with an array of filter elements. A first upstream filter element is a first electrically conducting filter electrode, being grounded. Downstream of the first filter element is a second electrically conducting filter element in a spaced relation to the first filter element. The second filter element is a wire ionizing array coupled directly to a positive port of a high voltage power supply. The voltage is adjusted to ionize particles passing through the second filter element. Downstream of the second filter element are third conducting filter element being grounded and a fourth conducting filter element, having a floating voltage. In between of the third and the fourth filter element is filter material.

JP 6-91199 A suggest determining the presence of a removable electrostatic precipitator having a first terminal being connected to a first port a high voltage source and a second terminal being grounded. A second port of the high voltage device is connected via a resistor with ground. The voltage drop across the resistor is compared to a reference voltage. Based on the voltage difference a decision is whether the high voltage supply is switched on or off.

While active field polarized media air cleaners allow to efficiently remove even submicron particles air-ionization enables to sterilize air as well as to remove odors on a molecular scale. Air-ionization requires, depending on the distance of the electrode about 5 kV and typically-depending on the size of the air-ionizer—a current of a few 10 µA to 10 mA. Corona discharge air cleaners are an example of air-ionizers. Industry scale gas ionizer may have correspondingly larger currents.

SUMMARY OF THE INVENTION

Embodiments of the invention are based on the observation that the thickness and the dielectric constant of the dielectric filter medium, as well as the surface areas of the electrodes have a direct impact on the voltage being required to provide a predefined electrical field E in the dielectric filter medium, as $$E = \frac{Q}{\epsilon_0 \epsilon_r A}$$

(assuming a plate-type capacitor for simplicity) wherein Q=C·U is the charge, C the capacity, U the voltage, A the surface and $\epsilon_0$, $\epsilon_r$ the electrical field constant and the relative permittivity, respectively. In other words, once the HV-source is installed, any change of the filter medium (material, effective surface, thickness, . . . ), which might be required due to a change of regulatory requirements for gas cleaning and/or due to a user preference for a particular level of cleaning and/or to adapt the gas cleaning system to different geographical or climate conditions is expensive, as it requires as well to replace the HV-source or to initially install an HV-source with an adjustable output voltage.

The embodiments are providing a solution to the problem of reducing the costs associated with replacing a gas filter of a first capacity $C_1$ and electrode surface $A_1$ with another gas filter of a different capacity $C_d$ and/or electrode surface $A_d$, while at the same time being able to verify the presence of the gas filter in a corresponding gas filter housing of a gas cleaning system.

A solution of the problem to be solved is the gas filter and the method both being described herein.

The gas filter may have an upstream facing side, a downstream facing side and a peripheral narrow facing side connecting the upstream facing side and the downstream facing side. Once installed in a gas filter housing, the upstream facing side may usually face toward the gas flow, i.e., the gas flow may enter into the gas filter via its upstream facing side and accordingly leave the gas filter via its downstream facing side. The gas flow may hence flow at least essentially through a cross section being confined by the narrow facing side, but the narrow facing side does not necessarily define the area of the cross section through which the gas flow may pass as will become apparent below.

The gas filter includes as least a filter medium for filtering (i.e., sieving) a gas flow that moves from the upstream facing side through the filter medium to the downstream facing side. The filter medium preferably includes a capacitor with at least a first electrode and a second electrode. A dielectric medium may be located in between of the first electrode and the second electrode. The first electrode and/or the second electrode and/or the dielectric medium may be structures as filter media/medium. The at least one filter medium may be permeable for a gas (e.g., air), but not for particles above a given particle size. Thus, the filter medium can be considered as a sieve.

In an example, the first electrode may be a first electrically conducting filter layer and/or the second electrode may preferably be a second conducting filter layer and/or the dielectric medium may be an intermediate isolating filter layer, wherein the term filter layer implies that the respective layer may be permeable for a gas (such as e.g., air) but not for particles above a threshold diameter. The threshold diameters may be different for the different filter layers.

The capacitor may be attached to a support. The support may preferably be non-conducting. For example, the portion of the surface facing away from the capacitor may be at least a part of the gas filter's narrow facing side.

The gas filter may further include a first electrical contact (hereinafter 'first contact') at a first location. The gas filter may further include a second electrical contact (hereinafter 'second contact') at a second location. Preferably, the first and/or second contact(s) may be attached to the support and/or unitary with the support. The first contact may preferably be configured to be removably connected to a high voltage output contact of a high voltage source. The second contact may preferably be configured to be removably connected to a ground contact of the high voltage source. The first and second electrical contacts may each be considered as an electrical connector or a terminal. The first and second electrical contacts may each be considered as an electrical connector and/or a terminal. The contacts enable and are hence configured to connect the filter element to a corresponding first and second housing contacts of a gas filter housing. The gas filter housing may include the HV-source and/or the first and second housing contacts may be electrically connected to the HV-output terminal and the ground terminal of the HV-source. Only to avoid confusion, the location of the HV-source is irrelevant, i.e., it may be attached to a housing body and hence be included by the filter housing or in any other location and/or not be included by the gas filter housing. In another example, the gas filter housing has third and fourth housing contacts for connecting the gas filter housing with a HV-source. For example, the third housing contact may be connected with the first housing contact and the fourth housing contact may be connected with the second housing contact.

In an example, the first electrical contact may be electrically connected via a first resistive component having resistance, R1 to a branching point and the second electrical contact may be electrically connected via a second resistive component having resistance R2 to the same branching point. Further, the first electrode may be electrically connected to the branching point as well. The second electrode may preferably be electrically connected to the second electrical contact. The corresponding first resistor and the second resistor and the branching point are thus, preferably a part of the gas filter. At least one of these parts may for example be attached to the support or a part of the support.

The gas filter enables to adapt the dielectric filter medium and hence the distance between the electrodes or the electrode surface as well as the relative permittivity to any need without changing the HV-source. An installed gas filter can thus be replaced by another gas filter with a different filter medium while avoiding costs or installation errors for replacing or adjusting the HV-source to the new filter medium, because the electrical field E' being intended to be present between the electrodes (after ramp up, i.e. $t\gg t_0$) of the new (=replacing) gas filter can be adjusted when manufacturing the new gas filter adjusting the resistivities $R_1$, $R_2$ of the first and the second resistors to accordingly amended values $R_1'$, $R_2'$, as the voltage $U_{cap}(t\gg t_0)$ across the capacitor may be provided by $$U'_{cap}(t) \approx \frac{R'_2}{R'_1 + R'_2} U_{HV} \forall\, t \gg t_0.$$

As usual, herein t denotes the time and $t_0$ may be the point in time when the HV-source has been switched on. The current being drawn from the HV-source can be selected to be negligibly small by simply choosing $R_1'+R_2'$ reasonably large. For example, a voltage $U_{HV}=4$ kV and an accumulated resistivity of $R_1'+R_2'=80$k$\Omega$ provides a current $I_{gf}$ drawn by the gas filter of only $I_{gf}=0.05$ mA.

Further, the ability to adjust the voltage across the capacitor in wide range allows to connect the gas filter to the same HV-source terminal, which feeds as well a gas-ionizer. Such an optional gas-ionizer may be placed in the gas conduit, preferably upstream of the first electrode, either as a part of the gas filter or as a separate part in the gas conduit. An example gas-ionizer is suggested in the German Patent Application DE 10 2021 120 127.6, the teaching of which is included herein by reference as if fully disclosed.

Typical values for operating gas-ionizers are in the range of a couple of kV (typically 3 to 6 kV). At these voltage levels, however, the dielectric media of typical active field polarized media gas cleaning filter would be destroyed by sparking. The gas filter as claimed, however allows to adjust $$\frac{R'_2}{R'_1 + R'_2}$$

appropriately, i.e., the voltage across the capacitor $$U_{cap}(t) \approx \frac{R'_2}{R'_1 + R'_2} U_{HV}$$

can be adjusted to any reasonable value, for example to a value between 0.5 kV and 1.5 kV.

Further, while an gas-ionizer drains a current of typical 10 µA-100 mA, the additional current for maintaining the electrodes of active field polarized media gas cleaner charged may be negligible as explained above: The gas filter may thus be connected in parallel to the same HV-source as a gas-ionizer of the gas cleaning system and thereby provide the first and second electrodes the intended voltage: Initially, when the HV-source is powered on (at $t_0=0$), the voltage between the first and the second electrical contact rises. The voltage at the capacitor $U_c(t)$ (assuming $t_0=0$) can be approximated as $$U_c(t) = \frac{R_2}{R_1 + R_2} \cdot U_{HV} e^{\frac{t}{R_1 C}}$$

accordingly, during ramp on, the current provided by the HV-source to the gas filter $I_{gf}(t)$ decreases exponentially until it reaches its lowest value $$\text{Min}(I_{gf}(t)) = \frac{U_{HV}}{R_1 + R_2}.$$

At the point in time, when the current provided to the gas filter is maximal, the current provided to the gas-ionizer is essentially zero, as the voltage is still below the minimum voltage required for the onset of ionization. In other words, the maximum current being drawn from the HV-source $\text{Max}(I_{HV}(t))$ is lower than the sum of the maximum currents through the gas filter $\text{Max}(I_{gs}(t))$ and the gas-ionizer Max $(I_{ai}(t))$, i.e. $\text{Max}(I_{HV}(t))<\text{Max}(I_{gf}(t))+\text{Max}(I_{ai}(t))$. Further, by selecting $R_1+R_2$ (or $R_1+R_2$, as the case may be) rather high, $\text{Max}(I_{gf}(t))$ can be reduced to practically almost negligible values. Thus, a single HV-source can be used to supply both, a gas-ionizer and the gas filter. Even retrofitting an existing gas cleaning system with a gas-ionizer may be possible, using the gas filter of claim 1, as the voltage between the first and second electrodes can be adapted as described and because $\text{Max}(I_{HV}(t))$ remains almost constant, as $\text{Max}(I_{gf}(t)) << \text{Max}(I_{ai}(t))$.

In an example, the gas filter includes a third electric contact T3 (third contact T3) at a third location, wherein the third electrical contact may be electrically connected to the first contact via a third resistive component having resistance R3. This allows to electrically connect the gas-ionizer to the HV-source via the gas filter. If the gas filter has been erroneously omitted, the gas-ionizer is preferably not connected to the HV-source, it remains switched off. Thereby, it can be avoided that the gas-ionizer is operated, if no gas filter is installed, as-in case the gas treated by the gas cleaning system is an oxygen including gas, such as air—this would lead to an increased Ozon ($O_3$) concentration in the air leaving the gas filter system. Such increased Ozon ($O_3$) concentration provides a health risk. As will be explained below, insertion of the gas filter can as well be detected by measuring the voltage and/or the current after switching the HV-source on.

Alternatively of in addition, the gas filter may include a fourth electric contact T4 (fourth contact T4) at a fourth location, wherein the fourth electrical contact may be electrically connected to the second contact T2 via a fourth resistive component having resistance R4. This allows to electrically connect the HV and the ground terminal of the optional gas-ionizer to the HV-source via the gas filter. The advantages are essentially the same as those of the third contact T3. Only to avoid misunderstandings, the term "fourth contact" does not imply that the third contact T3 is present. Hence in an example, the gas filter includes the first, second and fourth contacts T1, T2, T4, but not the third contact T3. In another example the gas filter includes all four of these contacts T1 to T4, i.e., the first, second, third and fourth contacts T1, T2, T3 and T4. The gas filter may as well include the first, second and third contacts T1, T2 and T3, but not the fourth contact.

The optional third and/or fourth resistive components (for example, resistors) with respective resistances R3, R4—if present—may be connected in parallel to the first and second resistive components (for example, resistors) with respective resistances R1, R2, respectively. They may as well be provided by a section of the first and second resistances/resistors R1, R2. In this case the first resistance R1 can be written as R1=R3+R3B, wherein R3B is the resistance between the third contact R3 and the branching point B. Similarly, the fourth resistance R4 may be provided by a section of the second resistance/resistor R2 and hence R2=R4+R4B, wherein R4B is the resistance between the fourth resistance/resistor R4 and the branching point B. In yet another example, the fourth contact point may be in between of the second electrode and the second contact T2. All these options and alternatives may simplify arrangement of the wiring and thus contribute to cutting the cost of the gas filter down.

In an example, the third resistance R3 between the first electrical contact and the third electrical contact may be smaller or equal to the first resistance R1 and/or the second resistance R2, i.e., R3≤Max({R1, R2}). For example, the third resistance R3 may be significantly smaller than the first resistance R1 and/or the second resistance R2, which can be written as R3≤$\alpha_R$·Max({R1, R2}), wherein $\alpha_R \in$ {0.5, 0.4, 0.3, 0.25, 0.2, 0.1, 0.05, 0.01, 0.001}. By selecting the third resistance $R_3$ to be negligibly small, the voltage drop and hence the power loss across $R_3$ can be minimized.

At least one of the first, second and/or the third electrical contacts may be attached to and/or located on the support. This eases safely connecting the corresponding contacts with their complementary counterparts of a gas filter housing when inserting the gas filter into the gas filter housing.

In an example, the first resistor $R_1$ and/or the second resistor $R_2$ and/or the third resistor $R_3$ may be or include a conductive polymer and/or a conductive ceramic and/or a conducting compound. The conductive polymer and/or the conductive ceramic and/or a conducting compound, are in many legislations not considered as electronic devices. The gas filter therefore is not considered as such and once its service life is reached, the gas filter may be disposed as 'normal waste' instead of being disposed as electronic scrap, being more expensive.

The electric contacts as well as the branching point(s) may as well be of said conductive polymer and/or the conductive ceramic and/or conducting compound, thereby reducing the number of materials being required when manufacturing the gas filter—which translates in manufacturing cost reduction—and recycling of the materials being used is as well simplified. In other words, the gas filter may include a module being formed of the conducting polymer and/or the conducting ceramic and/or a conducting compound, wherein the module includes or consists of the first contact, the second contact, the branching point, the first resistor $R_1$ and the second resistor $R_2$. Optionally the third resistor $R_3$ and the third contact may as well be a part of the module. In other words, all electrical components except of the first and second electrodes of the capacitor are preferably a part of the module. Such module may be manufactured as a single piece (and hence unitary) piece of the conducting polymer and/or conducting ceramic and/or a conducting compound. This allows to cut down manufacturing costs for the gas filter as well as disposal costs.

For example, the conductive polymer and/or conducting ceramic and/or a conducting compound may have an outer layer with a specific electrical resistivity $\rho_l$ and an inner layer or core with a core resistivity $\rho_c$. Only for linguistic simplicity, we do not distinguish between an inner layer or a core. This means, that the core may as well be a layer, as long as it is enclosed by the outer layer. In a first example, the core may have cross section being circular, polyhedric and/or elliptic or have any other cross section being delimited by a single curve. This would correspond to the intuitive notion of the term core and can be considered as an example. Alternatively, the core may have a ring-shaped cross section, i.e., it may be delimited by two closed curves, being closed loops. In this case the core may be located for example in between of two layers, an inner layer and an outer layer. The core may have a specific electrical resistivity $\rho_c$ wherein $\rho_c \approx \rho_l$ and/or $\rho_c < \alpha_\rho \cdot \rho_l$ and/or or $\rho_c > \alpha_\rho \cdot \rho_l$, wherein $\alpha_\rho \in \{0.9, 0.8, 0.75, 0.6, 0.5, 0.4, 0.3, 0.25, 0.2, 0.1\}$. For example, if the conducting polymer or the conducting ceramic includes conductive fibers being embedded in a non-conducting polymer and/or conducting ceramic and/or a conducting compound, the fibers in the core may be essentially randomly oriented and not even straight. In the vicinity of the surface of the conducting polymer and/or conducting ceramics and/or a conducting compound, the conducting fibers may, e.g., due to the process of extruding and/or injecting the polymer and/or the slip (a ceramic precursor) align. This may lead to an inhomogeneous transition resistance along the surface of the polymer and/or ceramic.

For example, the core may extend through the outer layer at the first location and/or the second location and/or the third location. Thereby, the core having a more homogenous and hence defined transition resistance can be contacted. Thus, at the first and/or second and/or third location, the core may preferably not be covered by the outer layer. This can be obtained, e.g., by locating a sprue at the respective location, thereby after removing the sprue, the core becomes exposed. Alternatively, one may use any subtractive method (such as for example grinding, polishing, drilling, milling, etching, . . . ) to remove a portion of the outer layer and thereby expose the core.

Alternatively, or in addition, the conducting polymer and/or conducting ceramic may have at least one recess at the first location and/or the second location and/or the third location. The recess allows a corresponding protrusion of the gas filter housing to enter into the recess. A conducting blade being that may optionally be attached to the protrusion may thereby cut into the core and provide for reliable electrical connection of the first, second and/or third electrical contact, respectively with the core. At the same time, the risk of injuries when inserting the blade can be reduced, as the protrusion may extend over the blade and thereby prevent human fingers or other parts from being injured by the blade or a potentially (and unitedly) applied HV to the blade. In other words, the gas filter housing may hence include at least one (preferably conducting) blade positioned to penetrate into the conducting polymer and/or the conducting ceramic and/or the conducting compound at the first location and/or the second location of the gas filter. This blade may be or be a portion of the first and/or second and/or third housing contact. In another example, the blade may be located in front of the respective housing contact, and hence configured to cut through the conducting polymer and/or conducting ceramic and/or conducting compound while the associated housing contact may follow the blade in the slot being provided by the cutting edge and thereby may be configured to contact the optional core of the conducting polymer and/or conducting ceramic and/or conducting compound.

The already mentioned protrusion of the gas filter housing may hence extend into the gas filter receptacle being provided by the gas filter housing. For example, the protrusion may extend from a housing wall towards the inside of the housing, i.e., towards the space being configured to receive the gas filter. In an example, the protrusion may be located to located to extend into the recess of an Alternatively or in addition the protrusion may be or include a ring and/or ring segment. The ring and/or ring segment may be located to at least partially encircle an outer boundary of the first and/or second and/or third electrical contact of the gas filter.

The blade may be located inside of the ring/ring segment. Alternatively, or in addition, the protrusion may extend further into the gas filter receptable than the blade. The protrusion may hence protect the blade from unintended touching or contacting. The corresponding housing contact may thus be protected by the protrusion, while at the same time the protrusion protects a worker during replacement of the gas filter from being hurt by the blade or a potentially applied voltage to said blade. In an example, at least the distal portion of the protrusion may be non-conducting, i.e., electrically isolating.

Preferably, the protrusion supports at least a portion of the blade. Thereby the blade can be made particularly thin. Thereby, the forces required to install the gas filter or more precisely required to drive the blade into the conducting polymer and/or the conducting ceramic and/or the conducting compound are low.

The gas filter may further include a gasket for sealing a gap to a wall defining gas filter receptacle of the gas filter housing. In an example, at least a portion of the conductive polymer and or the conductive ceramic may be positioned in between of the support and the gasket. The gasket hence protects the polymer against mechanical stress and at the same time isolates the portion of the conductive polymer and/or conductive ceramic. The gasket may as well attach the polymer to the support by adhesive bonding.

In another example, at least a portion of the gasket may be made of the conductive polymer. The number of different parts of the gas filter can be further reduced, which contributes to a reduction of the manufacturing cost.

The conductive polymer and/or conductive ceramic and/or a section thereof may be attached to and/or may extend over a section of the first electrode and/or of the second electrode, wherein an isolating sheath may be located in between of at least the section of the conductive polymer and/or conductive ceramic.

The gas filter enables to automatically detect its presence in a gas filter system as described herein without requiring additional contacts by the method disclosed herein. Based on the result of the determination an optionally present gas-ionizer of the corresponding gas cleaning system may be controlled. If correctly installed, the gas filter's first and second electrical contacts are electrically contacting corresponding first and second housing contacts T11, T12. These housing contacts are preferably connected to an HV-source.

The method may include the step of providing at least a first voltage $U_d$ to the housing contacts T11, T12 and to determine the current $I_h(U_d)$ through the housing contacts T11, T12. This current allows to determine, whether the gas filter is present or not by comparing the current $I_h(U_d)$ through the housing contacts T11, T12 with a threshold current $I_t$ and if $I_t > I_h(U_d)$ is true, there is no second resistor $R_2$ through which a current $I_h(U_d)$ may flow. Hence, in case $I_t > I(U_d)$ the gas filter is determined to be not properly installed (i.e., to be not present or lacking) and the gas-ionizer is preferably switched off and/or maintained switched off. This may be done by simply switching the HV-source off and/or by controlling the HV-source to provide a voltage below the onset voltage $U_o$ of gas ionization by said gas-ionizer. Further an error message may be symbolized, for example displayed in a screen or by simply illumination a control light.

In case the comparing step provides that the current $I(U_d)$ through the housing contacts is larger than said threshold current $I_c$, meaning $I_t < I(U_d)$ is true, then the gas-ionizer may be controlled to operate, as it may be expected that the gas filter is installed (i.e. the gas filter is determined to be present). In other words, the voltage provided to the gas-ionizer may be above its onset voltage $U_o$ as in this case it is very unlikely that the gas filter has not been installed.

Alternatively or in addition to directly measuring the current $I_h(U_d)$ for the above comparing steps, one may determine and consider any other value $\chi$ that may represent or be a measure of the current $I_h(U)$ or at least of $I_h(U_d)$. Such value $\chi$ may be measured and/or calculated. Generally, the condition on the value $\chi$ is that it is a mapping (e.g. a function) of the current $I_h$, ($\chi = \chi(I_h)$) and/or that it exists a mapping from the value $\chi$ to the current $I_h$ ($I_h = I_h(\chi)$). In both cases, the respective mapping may be unique or even bijective, but this is not required. Determining any of these values $\chi$ shall be considered in the context of this patent as determining the current $I_h$ as these values $\chi$ provide information about the current $I_h$. Examples for such values $\chi$ are for example the power consumption of the HV-source (obtainable by an input power measurement), the current drawn by the HV-source (obtainable by an input current measurement), a duty cycle of a pulse width modulated signal controlling the voltage across the housing terminals T11, T12 to $U_d$, a magnetic field, the resistance between the housing terminals T11, T12 or the like. It is clear that for each such value $\chi$ one has to define a corresponding threshold value $\chi_c$, which provides or is provided by the respective mapping (of) the threshold current $I_c$ and to use said $\chi_c$ in the comparing step. Depending on the mapping, one may have to invert the indicated relations, but this can be figured out by simple testing.

Preferably, the first voltage $U_d$ obeys $|U_o - \Delta U| \leq U_d \leq |U_o + \Delta U|$, wherein $\Delta U \in \{2 \text{ kV}, 1.5 \text{ kV}, 1 \text{ kV}, 0.75 \text{ KV}, 0.5 \text{ KV}\}$ and $U_o$ is still the onset voltage of the gas-ionizer. This choice of the voltage $U_d$ reduces the risk of erroneously controlling the gas-ionizer to operate or not, because the difference between the currents in the situations in which no gas filter is installed and when the gas filter is installed maximizes. This measure is particularly effective is the gas-ionizer is connected in parallel to first and second contacts of the gas filter.

The terms gas stream and gas flow are used interchangeably herein. Further, in this disclosure, the term gas includes as a preferred example the term air.

An isolator has an (almost) infinite resistivity, in other words, there is a band gap between the conduction band and the fermi level. A conductor in contrast fails to show this band gap, as the fermi level is in the conduction band. So called semiconductors having a band gap $\Delta E$ in the order of $k_\beta T$, wherein $k_\beta$ is the Boltzmann constant and T the temperature (in Kelvin) behave essentially like metallic conductors at the temperature T, although they behave like isolators at lower temperatures ($\Delta E \gg k_\beta T$). Thus, the terms isolator, isolating, conductor, conducting, non-conducting etc. reference and are defined with respect to electrical conductivity and not to thermal properties.

Herein the term conductive polymer and/or conductive ceramics encompasses not only polymers and/or ceramics being conductors or semiconductors, but as well compound materials based on a matrix of non-conducting polymers and/or non-conducting ceramic materials into which a conductive material such as e.g., metal and/or carbon fibers and/or graphite or the like have been integrated. The conducting compound hence may have a non-conductive matrix into which conductive fibers have been embedded and the conductivity of the compound can hence be attributed to the conductive fibers (which may as well be filaments, particles, beads or the like), being for example randomly distributed in the matrix.

The terms first, second, third, $n^{th}$ electrical contacts are herein considered as releasably contactable contacts which may as well be referred to as electrical terminal or electrical connector. These electrical contacts may be formed for example by a male pin type connector and/or a corresponding female sleeve type connector and/or a simple contact pad.

$n \in \{n_1, n_2, \ldots, n_k\}$ indicates that n may take any value of the set $\{n_1, n_2, \ldots, n_k\}$, for example $n=n_1$ or more generally $n=n_j$ and $1 \leq j \leq k$.

BRIEF DESCRIPTION OF THE DRAWINGS

In the following, the invention will be described by way of example, without limitation of the general inventive concept, on examples of embodiment and with reference to the drawings.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

Figure 1:
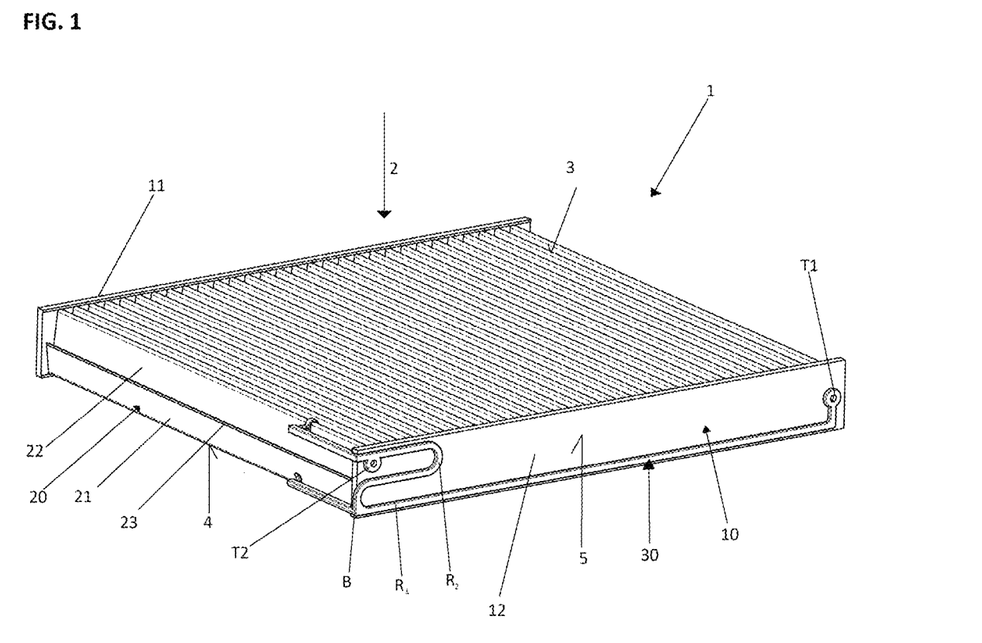
FIG. 1 shows a perspective view of first example of a gas filter.

FIG. 1 shows an example gas filter 1. The gas filter has an upstream facing side 3 and a downstream facing side 4, assuming a gas flow direction as indicated by arrow 2. Of course, the gas flow direction could be inverted as well. A narrow facing side 5 connects the upstream facing side 3 and the downstream facing side 4.

The gas filter 1 has a filter medium 20. The filter medium 20 may include one or more plied sheets, but this is only an example. Other types and shapes of filter media may be used as well. The filter medium 20 may preferably include at least three layers: two electrode layers 21, 22 and a dielectric layer 23 in between of the electrode layers 21, 22. Each of the electrode layers 21 may thus be considered as an electrode 21, 22 of a capacitor, wherein the dielectric layer 23 may be the capacitor's dielectric 23 in between of the two electrodes 21, 22 (cf. FIG. 6). The filter medium 20 may thus include and/or form a capacitor.

The gas filter 1 may further include at least one support 10. In the example, the support 10 includes a front wall 11 and rear wall 12 being preferably sealingly attached to opposing portions of the narrow side of the filter medium 20. Side walls (not shown) may be included as well by the gas filter 1, but as shown they may be omitted.

The gas filter 1 may have an electric module 30. As shown, the electric module 30 may include or preferably consist of an electrically conducting polymer string 30, which may as well be referred to as duct 30, string 30 or electrical conduit 30. Alternatively, or in addition, the module may include or consist of an electrically conducting ceramic string and/or a conducting compound. Only for linguistic simplicity, we use the term conductive polymer herein as a par pro toto for conductive polymer and/or conductive ceramic and/or conductive compound.

The electrically conducting string may have a first electrical contact T1. In this example, the first electrical contact T1 may preferably have a ring structure and hence forms a first recess being at least partially enclosed by the polymer string. The ring structure is not necessarily closed and may hence form a ring segment or a ring.

The first electrical contact may be connected by the conductive polymer 30 with a branching point B and thus the portion of the conductive polymer 30 which forms the electrical connection between the first contact T1 and the branching point B forms a first resistor $R_1$.

The electrically conducting polymer string may have a second electrical contact T2, which as well may as well form a ring or a ring segment. The second contact T2 may preferably be connected by a portion $R_2$ of the conducting polymer string 30 with the branching point. Thus, the portion of the conducting polymer connecting the second contact T2 and the branching point may define a second resistor $R_2$.

Further, the branching point B and the second terminal may preferably be connected, e.g., by said conducting polymer 30 to one of the first and the second electrode 21, 22.

Figure 5:
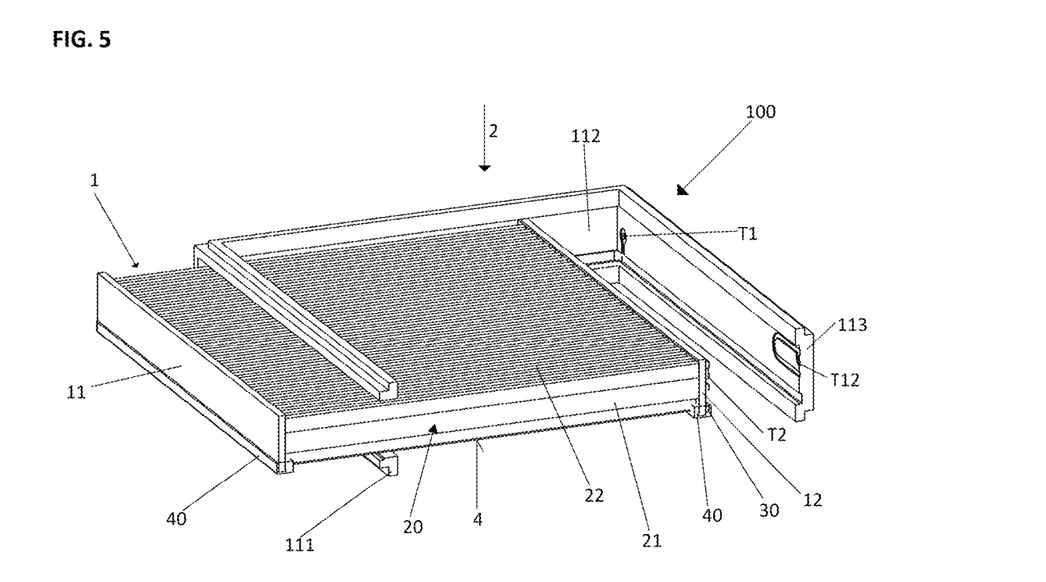
FIG. 5 shows the gas filter housing with a partially inserted gas filter.

Inserting the gas filter into a gas filter housing as shown, e.g., in FIG. 5 hence enables to provide an electrical connection of the first and second electrical contacts (T1, T2) with two poles of a HV-source, which may provide a voltage $U_{HV}$. The voltage between across the capacitor $U_{cap}$ may then be approximated by $$U_{cap}(t) = \frac{R_2}{R_1 + R_2} U_{HV},$$

(for large t, i.e. t>>$t_0$). By reducing or extending the lengths of the connections between the first contact T1 and the branching point B the voltage $U_{cap}$ can be adjusted to match the requirements provided by capacitor.

Figure 2:
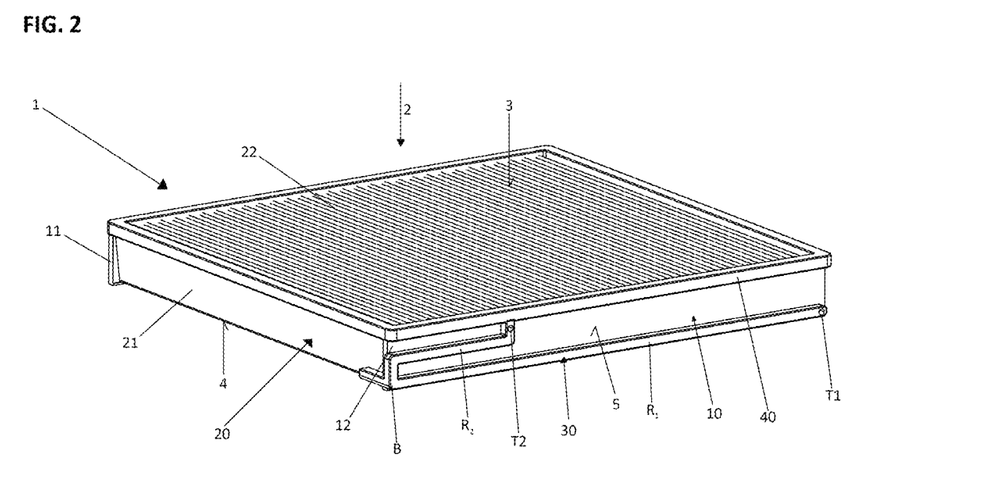
FIG. 2 shows a perspective view of second example of a gas filter.
Figure 3:
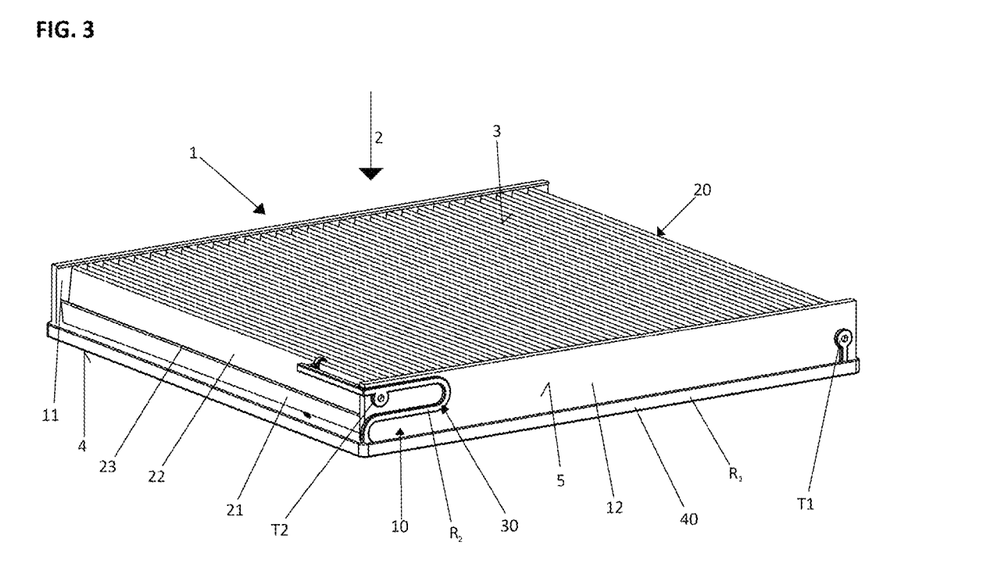
FIG. 3 shows a perspective view of third example of a gas filter.

FIGS. 2 and 3 each show a slightly different gas filter 1. The description of FIG. 1 may be read as well on FIGS. 2 and 3. In addition, the gas filters of FIGS. 2 and 4 each have a gasket 40. The gasket 40 may extend over the edge being formed by the upstream facing side 3 and the narrow facing side 5 and it may cover a portion of the string 30 thereby serving as adhesive for attaching the conductive polymer 30. In FIG. 2, the gasket 40 covers the portion of the conducting polymer 30 that contacts the second electrode. In FIG. 3, the gasket covers and hence fixates a portion of the electrical conduit 30, i.e., a portion of the string 30, that extends along a downstream edge of the support 10.

Figure 4:
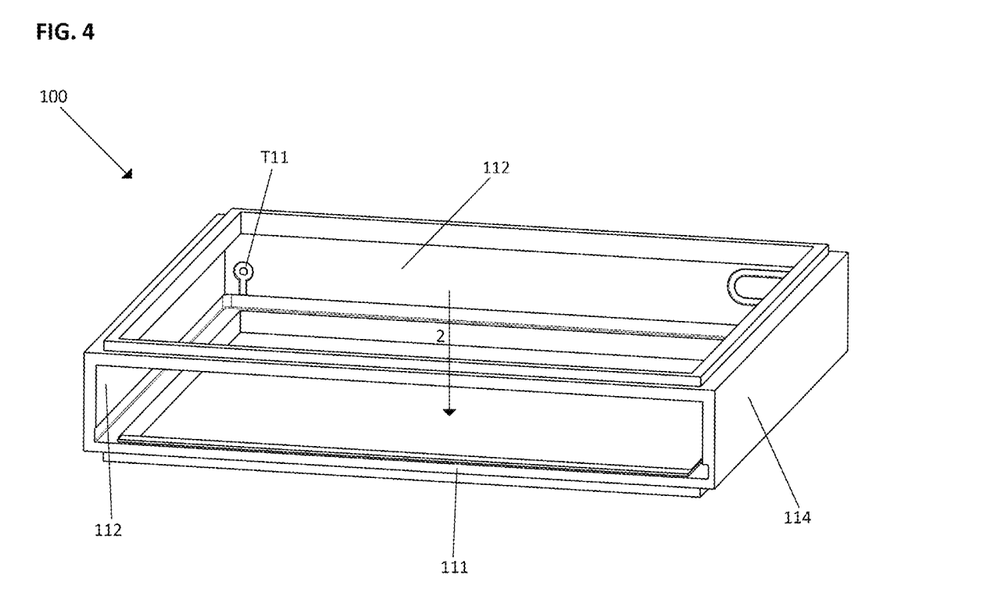
FIG. 4 shows a gas filter housing.

FIG. 4 shows an example gas filter housing 100. The gas filter housing 100 may be attached to or be integrated in a gas conduit and in this sense, its side walls 111 to 114 may be considered as a part of the gas conduit. The front side wall 111 may have an opening enabling to insert the rear portion of gas the filter 1 of FIG. 1 or FIG. 2 into the gas filter housing 100 as sketched in FIG. 5. The gas filter housing may preferably include at least a first and a second housing contact T11 and T12, configured to contact the first and the second contacts T1, T2 of the gas filter 1. In an example, the at least one of the housing contacts T11, T12 includes blade configured to penetrate through at least a portion of the polymer string 30, to thereby contact an inner portion of the polymer string, which inner portion may be referred to as a core. FIG. 5 shows the example gas filter 1 of FIG. 3 partially inserted into the gas filter housing 100. The side wall 114 has been omitted and the gasket 40 has been shown transparent. As can be seen, the first contact T1 may be configured to contact the first housing contact T11 and the second contact T2 may be configured to contact the first housing contact T12.

Figure 6:
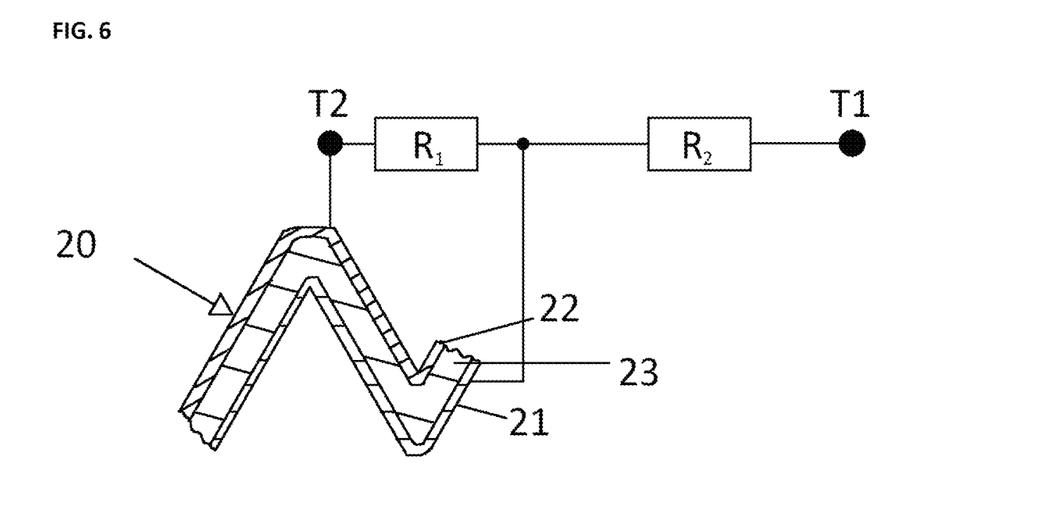
FIG. 6 shows a schematic of a filter medium.

FIG. 6 shows a detail of a filter medium 20 as may be used in any of the examples in FIGS. 1 to 3 and 4. The filter medium has a first electrode 21, a second electrode and a dielectric medium 23 between the first and the second electrodes 21, 22. T1 and T2 symbolize the first and second electrical contacts, B a branching point and the resistors $R_1$ and $R_2$ represent the electrical resistance of the corresponding connections by, for example the polymer string 30 as described above.

Figure 7:
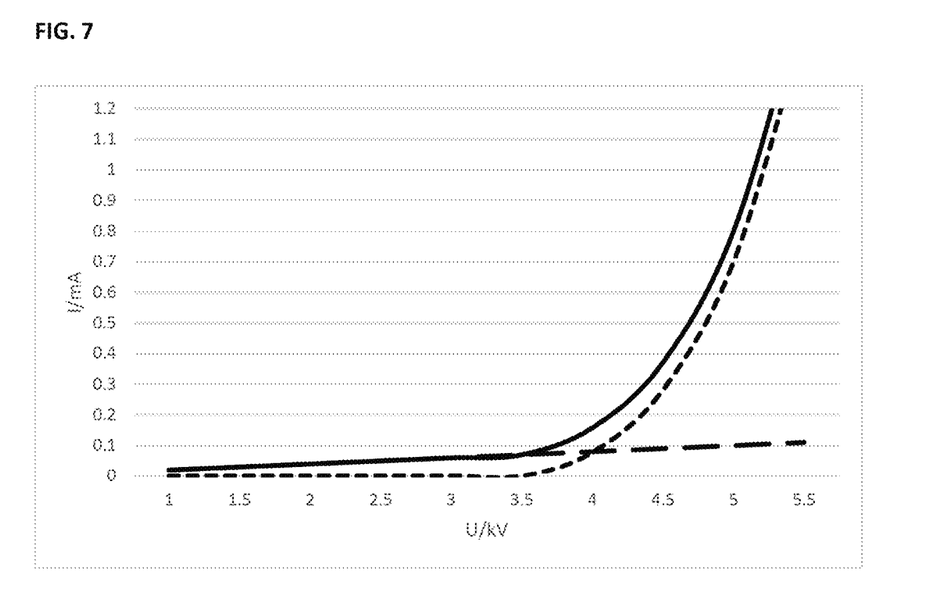
FIG. 7 shows current over voltage diagram.

FIG. 7 shows a diagram of three different current I(U) curves, wherein I(U) is indicated in mA and the voltage U is indicated in kV. The coarsely hatched curve describes the current across the electrical contacts T1 and T2 in the example of FIG. 6. The current values have been measured after the current stabilized, i.e., the current being depicted is essentially the current through the resistor R2 being defined by Ohm's law. Below 3.5 kV, the coarsely hatched curved is identical with the continuously drawn curve and hence cannot be optically distinguished.

The finer hatched curve describes the current through a gas-ionizer that is connected to the same HV-source, in parallel the electrical contacts T1 and T2. As can be seen, the gas ionization starts at an corona inception voltage of in this example about 3.5 kV (i.e. 3.5 kV is an example corona inception voltage $U_o$, that can be varied, e.g., by increasing or decreasing the distance of the gas-ionizer electrodes) and the current increases with increasing slope. The corona inception Voltage depends on the gas-ionizer and the gas but can be determined easily by measuring the current I(U) as a function of the supply voltage.

The solid line is the total current flowing if the gas-ionizer is connected in parallel to the HV-source supplying the T1 and T2 the electrical conduit 30 and hence the filter medium 20 (see FIG. 6). As can be seen, based on measurement of the output current of the HV-source one may distinguish, if the gas filter 1 has been inserted into the gas filter housing or not: In case the current $I(U_d)$ for a given voltage $U_d$ is below a threshold $I_t$, i.e., if $I(U_d) < I_t$, then, the HV-source is preferably switched off. Thereby, operation of the gas-ionizer does not take place and the ozone concentration in the air being provided by the corresponding gas cleaning system is low. Health risks due to an unintendedly high ozone-concentration can be avoided.

Preferably, the given voltage $U_d$ is below the corona inception voltage $U_o$ or in the vicinity (±2 kV, preferably ±1 kV, ±0.75 KV or ±0.5 KV) of the corona inception voltage $U_o$ of gas ionization by the installed gas-ionizer. In this voltage range the difference between the currents of the coarsely hatched curve and the finer hatched curve has a maximum. Thus, the risks of erroneously switching the HV-source off and of erroneously operating the air ionizer is reduced.

Figure 8:
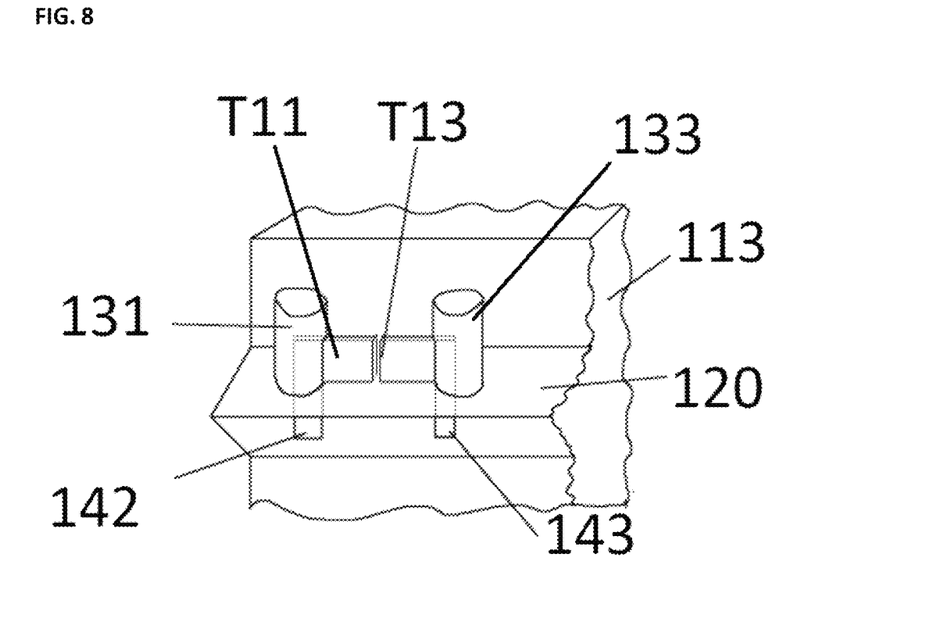
FIG. 8 shows a detail of a gas filter housing.

FIG. 8 shows a detail a further gas filter housing 100. The gas filter housing 100 has a housing wall 113 with a block 120 for defining the position of the gas filter 1. In this example, the gas filter 1 may be inserted from the top and may reside on the block 120. The gas filter housing 100 may have at least one (first) protrusion 131, the protrusion may be located to engage into a corresponding recess of an electrical contact T1, T2, or T3 of a conducting polymer, and/or a conducting ceramic and/or a conducting compound as shown in FIGS. 1, 2, 3, and 5. The protrusion 131 may supports a blade T11 with a cutting edge. Preferably, the cutting-edge points opposite to the direction of insertion of a gas filter, e.g., towards the housing opening in the front side wall 111 as shown in FIG. 4. When inserting the gas filter into the housing 100, the cutting edge of the blade shaped first housing contact T11 may penetrate into the material of duct 30 (i.e. into conducting polymer, and/or a conducting ceramic and/or a conducting compound) of the gas filter 1 and thereby electrically contact the core of said duct 30 with an HV-terminal of a HV-source 141.

As can be seen in FIG. 8, there may be another (third) protrusion (133), configured to engage into a another (third) recess of another (third) electrical contact of a gas filter 1. Similarly, to the first protrusion, a blade T13 may be attached to the third protrusion. The blade may form a third housing contact T13 and may be connected with an HV-terminal of a gas ionizer 143. As can be seen, there is an optional gap between the first and the third housing terminal T11, T13. Hence, the gas ionizer 143 may be connected to the HV-source 141 only if the duct 30 electrically connects the first and the third housing terminals T11, T13. In other words, if no gas filter 1 is inserted into the gas filter housing, the electrical connection between the HV-source and the gas ionizer is interrupted. Thereby, it may be safely avoided that harmful substances produced by an upstream gas-ionizer leave the gas filter housing without having passed the gas filter.

As visually apparent, the gap in between of the first and the third housing contacts T11, T13 is exaggeratedly small, thereby the resistance between the first and the third housing electrode is small as well. However, in practice, the distance should be selected reasonably large to avoid ionizing ambient air in the gap in case no gas filter has been inserted. In addition, or alternatively, a fourth isolating protrusion may be located in between of the housing contacts T12 and T13 to thereby allow these to be placed closer together, which results in a smaller resistance R3 between first and the third contact if the gas filter is installed.

As apparent from the description of FIG. 8, by omitting the terms "second housing electrode", "second blade" and "second protrusion", it is implied that the gas filter housing may have a second housing contact T12 being formed by a second blade T12 and being optionally attached to a second protrusion. These details are not depicted, as they may look like their first or third protrusion and/or blade respectively.

It will be appreciated to those skilled in the art having the benefit of this disclosure that this invention is believed to provide a gas filter and a method for determining the presence of a gas filter. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

| LIST OF REFERENCE NUMERALS | |
| --- | --- |
| 1 | gas filter |
| 2 | flow direction |
| 3 | upstream facing side |
| 4 | peripheral side |
| 5 | downstream facing side |
| 10 | support |
| 11 | front wall |
| 12 | rear wall |
| 20 | filter medium/capacitor |
| 21 | first conductive filter layer/first electrode |
| 22 | second conductive filter layer/second electrode |
| 23 | dielectric medium |
| 30 | electrical module optionally including a conductive polymer string and/or a conducting ceramic string and/or a conducting compound |
| 31 | first recess |
| 32 | second recess |
| 33 | third recess |
| 34 | outer layer |
| 36 | core |
| 40 | gasket (optional) |
| 100 | gas filter housing |
| 111 | front side wall/front wall |
| 112 | side wall |
| 113 | rear side wall/rear wall |
| 114 | side wall |

LIST OF REFERENCE NUMERALS

| 120 | block (optional) |
| --- | --- |
| 131 | protrusion (optional) |
| 132 | protrusion (optional) |
| 141 | to HV-source (optional) |
| 143 | to air ionizer (optional) |
| R1 | resistance/(resistor, resistive component) between the first electrical contact T1 and the branching point |
| R2 | resistance/(resistor, resistive component) between the branching point B and the second electrical contact T2. |
| T1 | first contact (configured to be connected to a high voltage contact of a high voltage source, e.g., via optional first housing contact T11) |
| T2 | second contact (configured to be connected to a ground contact of a high voltage source, e.g., via optional second housing contact T12) |
| T11 | first housing contact, configured to and/or being connected to a high voltage contact of a high voltage source |
| T12 | second housing contact, configured to be and/or being connected to a ground contact of a high voltage source |
| T13 | third housing contact, configured to be and/or being connected to a contact of an air-ionizer of a gas cleaning system |

The invention claimed is:

1. A gas filter having an upstream facing side, a downstream facing side, and a peripheral narrow facing side connecting the upstream facing side and the downstream facing side, the gas filter comprising at least:
   a filter medium configured to filter a gas flow moving from the upstream facing side through the filter medium to the downstream facing side, wherein the filter medium comprises and/or forms a capacitor, and wherein the capacitor has at least a first electrode, a second electrode, and a dielectric medium, wherein the first electrode, the second electrode and/or the dielectric medium is structured as a filter layer,
   at least a non-conducting first support, wherein the capacitor is attached to the non-conducting first support,
   a first electrical contact at a first location,
   a second electrical contact at a second location,
   a branching point, a first resistive component having a first resistance R1, and a second resistive component having a second resistance R2,
wherein:
   each of the first electrical contact and the second electrical contact is attached to the non-conducting first support and/or is unitary with the non-conducting first support,
   each of the branching point, the first resistive component, and the second resistive component is attached to the non-conducting first support or is a part of the non-conducting first support,
   the first electrical contact is electrically connected via the first resistive component to the branching point, the second electrical contact is electrically connected via the second resistive component to the branching point and the first electrode is electrically connected to the branching point, and
   the second electrode is electrically connected to the second electrical contact.

2. The gas filter of claim 1, further comprising a third electrical contact at a third location, wherein the third electrical contact is electrically connected to the first electrical contact via a third resistive component having a third resistance R3.

3. The gas filter of claim 2, wherein the third resistance R3 between the first electrical contact and the third electrical contact is smaller than or equal to the first resistance R1 and/or the second resistance R2, i.e. R3≤Max({R1, R2}).

4. The gas filter of claim 1, wherein the third electrical contact is attached to and/or located on the non-conducting first support.

5. The gas filter of claim 1, wherein the first resistive component and/or the second resistive component includes a conductive polymer and/or a conductive ceramic and/or a conducting compound, wherein at least a portion of the conductive polymer and/or the conductive ceramic and/or the conducting compound is attached to the non-conducting first support, wherein the conducting compound has a non-conducting matrix into which conductive fibers are embedded.

6. The gas filter of claim 5, wherein the conductive polymer and/or the conductive ceramic and/or the conductive compound has an outer layer with a specific electrical resistivity $\rho_l$ and a core with a specific electrical resistivity $\rho_c$, wherein $\rho_l < \alpha_p \cdot \rho_c$ or $\rho_l > \alpha_p \cdot \rho_c$ and $\alpha_p \in \{0.9, 0.8, 0.75, 0.6, 0.5, 0.4, 0.3, 0.25, 0.2, 0.1\}$.

7. The gas filter of claim 6, wherein the core extends through the outer layer at the first location and/or the second location.

8. The gas filter of claim 6, further comprising a third contact at a third location, wherein the third contact is electrically connected to the first contact via a third resistive component and wherein the core extends through the outer layer at the first location and/or the second location and/or the third location.

9. The gas filter of claim 5, wherein the conducting polymer and/or the conductive ceramic and/or the conductive compound has at least one recess, at the first location and/or the second location.

10. The gas filter of claim 5, further comprising a third contact at a third location, wherein the third contact is electrically connected to the first contact via a third resistive component and wherein the conducting polymer and/or the conductive ceramic and/or the conductive compound has at least one recess at the first location and/or the second location and/or the third location.

11. The gas filter of claims 1, wherein the gas filter comprises a gasket configured to seal a gap to a wall that defines a gas filter receptacle.

12. The gas filter of claim 9, wherein the electrically conductive polymer and/or the conductive ceramic and/or the conductive compound forms at least a section of a gasket of the gas filter, the gasket being configured to seal a gap to a wall that defines a gas filter receptacle.

13. The gas filter of claim 5, wherein the conductive polymer and/or the conductive ceramic and/or the conductive compound is attached to or extends over a section of the first electrode and/or of the second electrode, wherein an electrically isolating sheath is located in between the conductive polymer and/or the conductive ceramic and at least a portion of the section of the first electrode and/or of the second electrode.

14. A method comprising:
   determining a presence of the gas filter according to claim 1 in a gas filter housing of a gas filter system having an air ionizer and a high-voltage source that, if the gas filter is correctly installed in the has filter housing, is connected to first and second housing contacts configured to contact the first and second electrical contacts, by:

providing at least a first voltage $U_d$ to the first and second housing contacts and measuring a current I $(U_d)$ through the first and second housing contacts; and comparing the current I (Ul) through the first and second housing contacts with a threshold current $I_t$ and, if $I_t>I(U_d)$ is true, switching the air-ionizer off and/or keeping the air ionizer switched off, and otherwise if $I_t<I(U_d)$ is true, then switching the air-ionizer on and/or keeping the air ionizer switched on.

15. The method of claim 14, wherein the first voltage $U_d$ obeys $|U_o-\Delta U|\le U_d\le |U_o+\Delta U|$, wherein $\Delta U \in \{1.5\ kV, 1\ kV, 0.75\ KV, 0.5\ KV\}$ and $U_o$, is the corona inception voltage of the air ionizer.

16. A gas filter system comprising at least a high-voltage source and a gas-filter housing having a gas filter receptacle with first and second housing contacts that are electrically connected to different terminals of the high- voltage source, wherein the gas filter system further comprises at least:

the gas filter of claim 1, wherein the first and second electrical contacts are configured to electrically contact the first and second housing contacts, respectively;

and/or a controller configured to perform at least the following steps:

(a) providing at least a first voltage $U_d$ to the first and housing contacts and measuring a current $I(U_d)$ through the first and second housing contacts;

(b) comparing the current $I(U_d)$ through the first and second housing contacts with a threshold current $I_t$ and if $I_t>I(U_d)$ is true, then switching the air-ionizer off and/or keeping the air ionizer switched off, otherwise if $I_t<I(U_d)$ is true, then switching the air-ionizer on and/or keeping the air ionizer switched on;

and/or at least one blade with a cutting edge, wherein the cutting edge extends into the gas filter receptacle and wherein the at least one blade is the first housing contact and/or the second housing contact.

17. The gas filter system of claim 16, wherein the gas filter system further comprises the at least one blade with a cutting edge, wherein the at least one blade is positioned to penetrate into a conducting polymer and/or a conducting ceramic and/or a conducting compound at the first location and/or the second location of the gas filter.

18. The gas filter system of claim 16, wherein the first resistive component and/or the second resistive component includes a conductive polymer and/or a conductive ceramic and/or a conducting compound, wherein at least a portion of the conductive polymer and/or the conductive ceramic and/or the conducting compound is attached to the non-conducting first support, wherein the conducting compound has a non-conducting matrix into which conductive fibers are embedded;

wherein the conducting polymer and/or the conductive ceramic and/or the conductive compound has at least one recess, at the first location and/or the second location;

wherein the gas filter housing further comprises at least one protrusion extending into the gas filter receptacle and located to extend into the recess of the gas filter or to at least partially encircle an outer boundary of the first electrical contact and/or second electrical contact and/or third electrical contact of the gas filter.

19. The gas filter system of claim 18, wherein the gas filter system further comprises a blade with a cutting edge, and wherein:

the at least one protrusion extends further into the gas filter receptacle than the blade, and/or the at least one protrusion is non-conducting and/or the blade is attached to the at least one protrusion, and/or the at least one protrusion forms a ring and/or a ring segment, wherein the cutting edge of the blade is at least partially surrounded by the ring and/or ring segment.

* * * * *